US010296466B2

(12) United States Patent
Kato

(10) Patent No.: US 10,296,466 B2
(45) Date of Patent: May 21, 2019

(54) INFORMATION PROCESSING DEVICE, METHOD OF CONTROLLING A CACHE MEMORY, AND STORAGE MEDIUM

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 15/485,661

(22) Filed: Apr. 12, 2017

(65) Prior Publication Data

US 2017/0329721 A1    Nov. 16, 2017

(30) Foreign Application Priority Data

May 10, 2016  (JP) ................................. 2016-094628

(51) Int. Cl.
  *G06F 12/123* (2016.01)
  *G06F 12/0891* (2016.01)
  *G06F 12/0868* (2016.01)

(52) U.S. Cl.
  CPC ........ *G06F 12/123* (2013.01); *G06F 12/0868* (2013.01); *G06F 12/0891* (2013.01);
  (Continued)

(58) Field of Classification Search
  CPC .. G06F 12/123; G06F 12/086; G06F 12/0891; G06F 2212/1016; G06F 2212/286; G06F 2212/312; G06F 2212/60
  See application file for complete search history.

(56) References Cited

U.S. PATENT DOCUMENTS 6,996,676 B2 *  2/2006  Megiddo ............... G06F 12/122
                                                  711/129
8,161,241 B2 *  4/2012  Bhattacharjee ........ G05D 23/19
                                                  711/112
(Continued)

FOREIGN PATENT DOCUMENTS

JP      05-303528      11/1993
JP      2014-535106    12/2014

OTHER PUBLICATIONS

Z. Fan, D. H. C. Du and D. Voigt, "H-ARC: a non-volatile memory based cache policy for solid state drives," 2014 30th Symposium on Mass Storage Systems and Technologies (MSST), Santa Clara, CA, 2014, pp. 1-11. (Year: 2014).*

(Continued)

*Primary Examiner* — Ramon A. Mercado
(74) *Attorney, Agent, or Firm* — Fujitsu Patent Center

(57) ABSTRACT

A device includes: a cache memory configured to store a first list and a second list, and a processor. The first list includes one or more entries that include any one of data pieces in a storage device and information indicating a location of the data piece on the storage device, and the second list includes one or more entries that include information indicating a location of an already discarded data piece on the storage device, the already discarded data piece having been included in an entry that has been evicted from the first list. The processor counts a count number of entries including data pieces updated and being consecutive from an eviction target entry when updating data piece of an entry in the first list, and writes data of a target entry in the storage device and discards the data from the cache memory based on a certain rule.

12 Claims, 11 Drawing Sheets

(52) U.S. Cl.
  CPC ............... *G06F 2212/1016* (2013.01); *G06F 2212/284* (2013.01); *G06F 2212/312* (2013.01); *G06F 2212/60* (2013.01)

(56) References Cited

U.S. PATENT DOCUMENTS

| | | | | |
|---|---|---|---|---|
| 9,524,245 | B2* | 12/2016 | Zhu | G06F 12/0871 |
| 2002/0103976 | A1* | 8/2002 | Steely, Jr. | G06F 12/0804 |
| | | | | 711/135 |
| 2013/0111131 | A1 | 5/2013 | Benhase et al. | |
| 2013/0111133 | A1* | 5/2013 | Benhase | G06F 12/0888 |
| | | | | 711/122 |
| 2013/0242425 | A1* | 9/2013 | Zayas | G11B 5/012 |
| | | | | 360/15 |
| 2013/0326115 | A1* | 12/2013 | Goss | G06F 3/0641 |
| | | | | 711/103 |
| 2014/0115244 | A1* | 4/2014 | Maybee | G06F 12/0897 |
| | | | | 711/105 |
| 2014/0115260 | A1* | 4/2014 | Maybee | G06F 17/30132 |
| | | | | 711/136 |
| 2017/0329721 | A1* | 11/2017 | Kato | G06F 12/0868 |

OTHER PUBLICATIONS

Adaptive replacement cache—Wikipedia, the free encyclopedia [online], retrieved Internet Search Mar. 24, 2016, <https://en.wikipedia.org/wiki/Adaptive_replacement_cache> (3 pages).

\* cited by examiner

… (1) …

INFORMATION PROCESSING DEVICE, METHOD OF CONTROLLING A CACHE MEMORY, AND STORAGE MEDIUM

CROSS-REFERENCE TO RELATED APPLICATION

This application is based upon and claims the benefit of priority of the prior Japanese Patent Application No. 2016-094628, filed on May 10, 2016, the entire contents of which are incorporated herein by reference.

FIELD

The embodiment discussed herein is related to an information processing device, a method of controlling a cache memory, and a storage medium.

BACKGROUND

Conventionally, there has been known a technique of improving the access performance to storage devices by using cache memories that can be accessed at higher speed than the storage devices. Moreover, an operation, what is called a write back, has been also known in which when a write request to a storage device is received, data is written in a cache memory without being written in the storage device, and the updated data on the cache memory is written in the storage device in a spare time such as an idle time of processing by a central processing unit (CPU). Moreover, a technique, what is called cache replacement policies, has been also known in which when a cache memory is full and unable to additionally store new data, data that is most unlikely to be used afterward is predicted, the predicted data is discarded, and the new data is added instead.

As known related prior art, there is a technique of adjusting a heat metric threshold in accordance with caching efficiency of a present state of a secondary data storage cache; and rejecting candidate data provided to the secondary data storage cache whose heat metric is less than the heat metric threshold, for example. Moreover, there is another technique in which multiple blocks consecutive on a disk are set as one group, and when a group including a block that is updated only on a cache memory is present, the multiple consecutive blocks in the group are written back onto the disk by one access.

As examples of the related prior art, known are Japanese National Publication of International Patent Application No. 2014-535106 and Japanese Laid-open Patent Publication No. 05-303528.

SUMMARY

According to an aspect of the invention, an information processing device includes: a storage device configured to store a plurality of data pieces; a cache memory configured to store a first list and a second list, the first list including one or more entries that include any one of the plurality of data pieces and information indicating a location of the plurality of data piece on the storage device, and the second list including one or more entries that include information indicating a location of an already discarded data piece on the storage device, the already discarded data piece having been included in an entry that has been evicted from the first list; and a processor coupled to the storage device and the cache memory, wherein the processor is configured to: when there is an update of the data piece of an entry determined as an eviction target in the first list based on a priority in accordance with a predetermined cache replacement policy, count a count number of entries including the data pieces updated and being consecutive from the eviction target entry determined in the order of the priority, and when a second total value is larger than a first total value, the first total value indicating a total number of accesses to the count number of the entries consecutive from the eviction target entry, the second total value indicating a total number of accesses to the count number of entries consecutive from the entry most recently added to the second list in accordance with the order of the priority, write the data of the eviction target entry in the storage device, and discard the data of the eviction target entry from the cache memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

The related art may have a difficulty deciding when to write back updated data on a cache memory. For example, if the write-back operation is performed at long time intervals, the write-back operation may discard data yet to be updated, instead of updated data that is predicted to be most unlikely to be used in accordance with the cache replacement policy, so that the hit rate in the cache memory may be lowered.

In one aspect, an embodiment discussed herein decides a suitable timing for writing back updated data on the cache memory.

The following describes an embodiment of an information processing device, a cache memory control method, and a cache memory control program in details with reference to the drawings.

Figure 1:
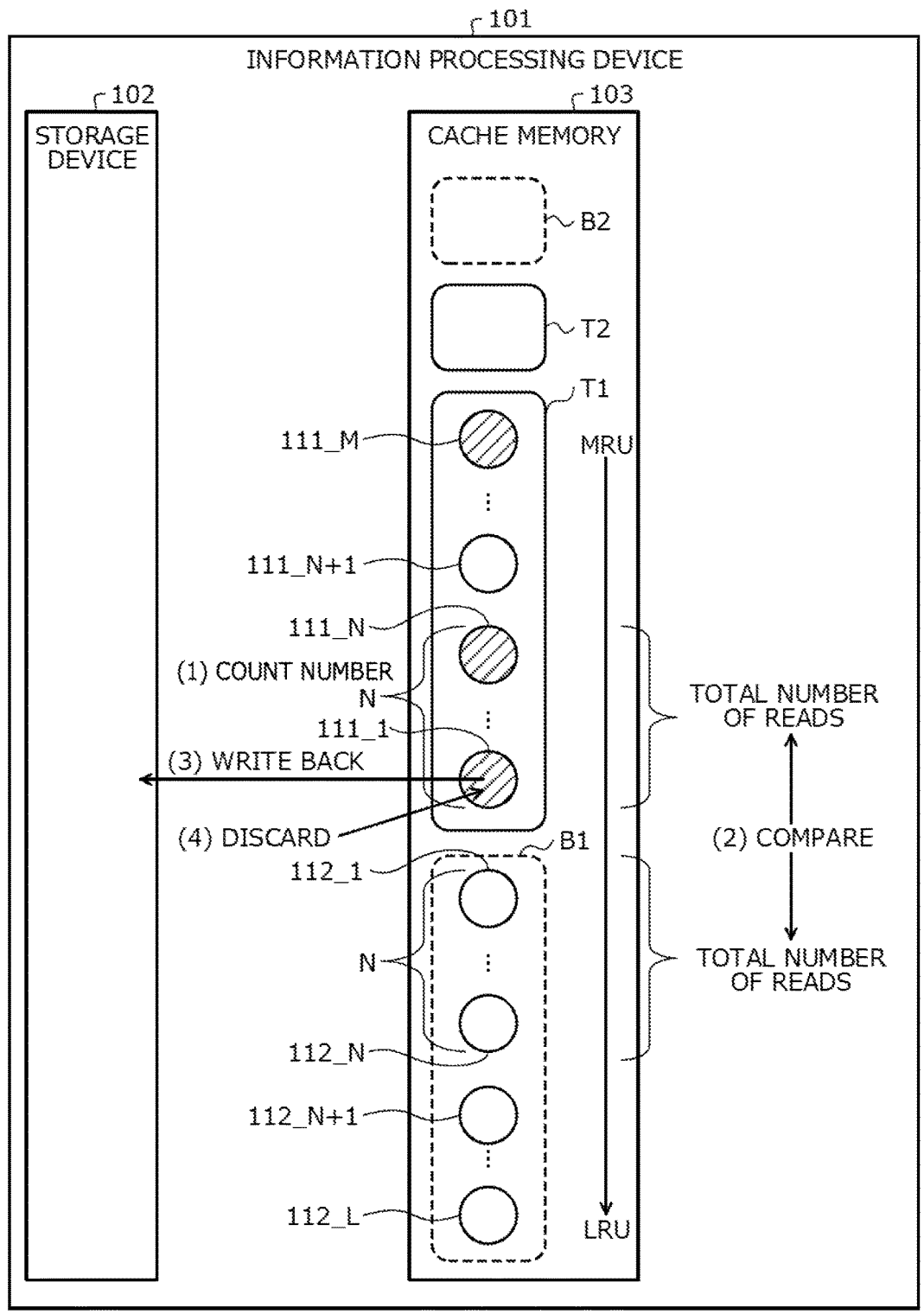
FIG. 1 illustrates an operation example of an information processing device according to an embodiment.

FIG. 1 illustrates an operation example of an information processing device 101 according to the present embodiment. The information processing device 101 is a computer that controls a cache memory. The information processing device 101 is capable of accessing a storage device 102 that stores therein multiple data pieces, and a cache memory 103. The information processing device 101 is, for example, a disk array device, a server, a personal computer (PC), a tablet terminal, a mobile terminal, or a mobile telephone. The cache memory 103 is a storage device achieving higher access performance than that of the storage device 102. The cache memory 103 temporarily stores therein data stored in the storage device 102. A CPU in the information processing device 101 uses the cache memory to access data to make up for a performance difference between the storage device 102 and the CPU.

Moreover, the cache memory is installed between the CPU and a random access memory (RAM), and stores therein part of data in the RAM. However, the cache memory is not limited to such a use form. For example, the RAM is regarded as a cache memory, and the RAM may temporarily store therein data in a lower-speed storage device than the RAM. Examples of the lower-speed storage device than the RAM include a solid state drive (SSD), a hard disk drive (HDD), an optical disk drive, and a tape drive including magnetic tape.

Moreover, the cache memory manages data in the storage device by dividing the data into data pieces in a fixed size, which are called pages. Further, the cache memory includes multiple entries, and each of the multiple entries stores therein a given one of multiple pages and metadata on the given page. The metadata includes information indicating a location of the given page on the storage device. The information indicating a location of the given page on the storage device is, for example, information on a logical unit number (LUN) or a logical block addressing (LBA) where the given page is held.

Moreover, when the cache memory is full and unable to add a new entry, an eviction target entry is decided based on the priority in accordance with the cache replacement policy. For example, the cache replacement policy is a policy that predicts an entry most unlikely to be used afterward, and decides the predicted entry as an eviction target entry. Examples of the cache replacement policy include a least recently used (LRU) policy, a least frequently used (LFU) policy, and an adaptive replacement cache (ARC) policy.

Moreover, an operation called write-back is one of operation policies for a cache memory. The write-back operation is a method in which when a write request to a storage device is received, data is not written in a storage device but is written in a cache memory, and in a spare time such as an idle time of processing by the CPU, an updated page on the cache memory is written in the storage device. Hereinafter, a page updated on the cache memory but yet to be written in the storage device is called "Dirty page". Meanwhile, a page other than a Dirty page on the cache memory is called "Clean page". In order to maintain data consistency, a Dirty page is discarded after the Dirty page is written back.

Employing the write-back operation makes use of the characteristic in which the cache memory is capable of storing data at higher speed than the storage device, and increases the speed of write performance.

However, in the write-back operation, it may be difficult to decide when to write back a Dirty page on the cache memory. Here, a Dirty page is disabled from being discarded unless the Dirty page is written back. For this reason, if a Dirty page is predicted to be most unlikely to be used in accordance with the cache replacement policy, a Clean page that is predicted to be more likely to be use than the Dirty page is discarded. Accordingly, for example, if the write-back operation is performed at long time intervals, the Clean page may be discarded instead of the Dirty page that is predicted to be most unlikely to be used, so that the hit rate for the cache memory may be lowered. On the other hand, if the write-back operation is performed at a short time intervals, a speed-up effect obtained by the write-back operation is reduced. For example, if data can be overwritten on the cache memory, a volume of data written to the storage device is reduced. However, if the write-back operation is performed at a short time intervals, opportunities to overwrite the data on the cache memory are reduced. Moreover, when the storage device is an SSD, the SSD has the maximum number of write allowable times. Accordingly, the frequent write-back operation shortens the lifetime of the SSD. Hence, the smaller the number of the write-back operations, the better.

Therefore, in the present embodiment, a Ghost list employed in the ARC is effectively used. For example, in the ARC, used are a normal list including entries each including a data piece and metadata, and a Ghost list including entries that were in the normal list and had the data piece discarded, and includes only metadata on the already discarded data piece. An operation example of the ARC will be described in FIG. 2.

In the present embodiment, described is a method in which the number of entries including Dirty pages consecutive from an original eviction target entry in a normal list is counted, and if entries, in the number thus counted, consecutive from the top in a Ghost list are more frequently accessed than the former entries including the Dirty pages, the page of the original eviction target entry is written back. The following explanation is based on use of the ARC. In addition, although any cache replacement policy may be employed, the LRU is employed as a predetermined cache replacement policy, and an eviction target entry is decided based on the priority of the LRU. Also, a comparison in access frequency between the normal list and the Ghost list is made based on the number of reads.

Figure 2:
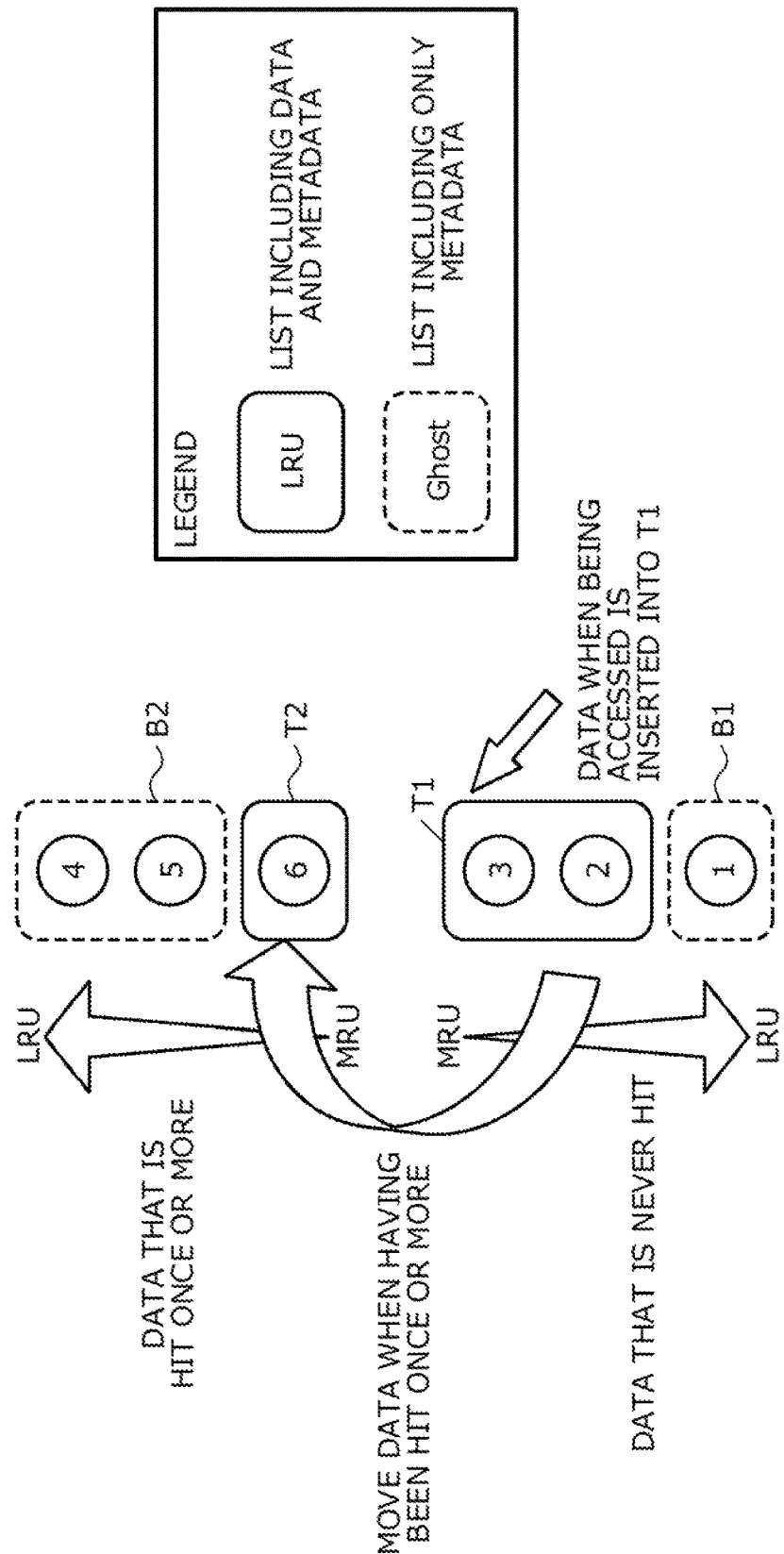
FIG. 2 illustrates an operation example of an ARC.

An operation example of the information processing device 101 will be described using FIG. 1. The cache memory 103 stores therein a list T1 as a first list that serves as a normal list, and a list B1 as a second list that serves as a Ghost list. In addition, the ARC is employed in the example of FIG. 1, so that the cache memory 103 stores therein lists T2 and B2. In the examples of FIG. 1 and FIG. 2, the normal lists are illustrated by the solid line, and the Ghost lists are illustrated by the dashed line. Moreover, in the examples of FIG. 1 and FIG. 2, entries in the lists T1 and B1 are arranged in the order from the most recently used (MRU) to the LRU.

Each of the lists T1 and B1 includes entries that have never been hit. Moreover, the lists T2 and B2 each include entries that are hit once or more. The present embodiment is applicable to the lists T1 and B1, the present embodiment is applicable to the lists T2 and B2, and the present embodiment is applicable to both of the lists T1 and B1 and the lists T2 and B2. The example of FIG. 1 will be described using the lists T1 and B1.

The list T1 includes entries 111_1 to 111_M each of which includes data and metadata. Moreover, the list B1 includes entries 112_1 to 112_L each of which includes metadata. Moreover, the entries 111_1 to 111_N and the entry 111_M include Dirty pages. In the example of FIG. 1, each entry 111 that includes a Dirty page is hatched.

Moreover, the lists T1 and B1 are arranged in the order from the MRU to the LRU, and thus the MRU of the list T1 is the entry 111_M and the LRU of the list T1 is the entry 111_1. Similarly, the MRU of the list B1 is the entry 112_1, and the LRU of the list B1 is the entry 112_L. The entry 112_1 is the entry that is added to the list B1 most recently among the entries 112_1 to 112_L.

When the entry 111_1 as an eviction target in the list T1 is a Dirty page, as illustrated in (1) of FIG. 1, the information processing device 101 counts the number of Dirty pages consecutive from the entry 111_1 in the order of the LRU. In the example of FIG. 1, Dirty pages are consecutive from the entry 111_1 to the entry 111_N, and thus the information processing device 101 counts N.

Here, the entries 111_1 to 111_N have to be originally present in the list B1, but remain in the list T1 because they include the Dirty pages. Further, the entries 112_1 to 112_N in the same number as that of the entries 111_1 to 111_N have to be originally present in the list T1, but are evicted from the list T1 instead of the entries 111_1 to 111_N, which remain in the list T1. Note that, the entries 111_N+1 to M and the entries 112_N+1 to 112_L are stored in the proper lists in accordance with the ARC.

Next, as illustrated in (2) of FIG. 1, the information processing device 101 compares a first total that is the total number of reads to N entries from the entry 111_1, with a second total that is the total number of reads to N entries from the entry 112_1. For example, the information processing device 101 may store the number of reads to each of the entries 111_1 to 111_M and the number of reads to each of the entries 112_1 to 112_L in the cache memory 103, and respectively calculate the first total and the second total from the numbers of reads. Alternatively, the information processing device 101 may store the first total and the second total in the cache memory 103, increment the first total by 1 in a read to any of the entries 111_1 to 111_N, and increment the second total by 1 in a read to any of the entries 112_1 to 112_N.

A case where the first total is equal to or more than the second total is a case where the Read hit increases actually, and thus is not a timing for performing the write-back operation. Hence, the cache memory 103 is left as it is. In contrast, a case where the second total is more than the first total is actually a case where the Read hit decreases, and thus is a timing for performing the write-back operation in order to improve the Read hit rate.

In the example of FIG. 1, assumed is a case where the second total is more than the first total. In this case, the information processing device 101 writes back a Dirty page of the entry 111_1, as illustrated in (3) of FIG. 1. The information processing device 101 then discards the page of the entry 111_1 from the cache memory 103, as illustrated in (4) of FIG. 1. The page of the entry 111_1 is discarded and the entry 111_1 is added to the list B1. Decrease in the Dirty pages results in improvement in the Read hit rate.

Moreover, when writing of a Dirty page is managed in a Watermark model, in a case where the second total is more than the first total, the information processing device 101 may vary the Watermark value to allow writing of a Dirty page to be performed. The Watermark model will be described in FIG. 5.

As in the foregoing, the information processing device 101 knows such a suitable write-back operation timing that the Read hit rate may improve. Next, an operation example of the ARC will be described using FIG. 2.

FIG. 2 illustrates an operation example of the ARC. The ARC is a method in which the size of a list including entries is adjusted using a Ghost list to maximize the hit rate. Moreover, the ARC is commonly used in storage products.

As illustrated in FIG. 2, the ARC manages four LRU lists. The first list T1 stores therein data and metadata, and holds therein entries that have been accessed once. The second list B1 holds therein entries that have been evicted from the list T1 and that store therein metadata. The third list T2 holds therein entries in which data present in the list T1 is hit. The entry held in the list T2 stores therein data and metadata. The fourth list B2 holds therein entries that have been evicted from the list T2 and that store therein metadata.

As in the foregoing, the lists T1 and B1 each include entries on data that have been never hit. Moreover, the lists T2 and B2 each include entries on data that have been hit once or more. Moreover, when an entry present in the list T1 is hit once, the hit entry is moved into the list T2. Moreover, when an entry in the list B1 is hit, the size of the list T1 is expanded. Meanwhile, when an entry in the list B2 is hit, the size of the list T2 is expanded.

In the example of FIG. 2, entries 1 to 3 are held in the lists T1 and B1, and entries 4 to 6 are held in the lists T2 and B2. Further, among the entries 1 to 3, the entry 3 is the MRU, and the entry 1 is the LRU. Moreover, the entry 1 holds therein only metadata, and the entries 2 and 3 each hold therein data and metadata. Moreover, among the entries 4 to 6, the entry 6 is the MRU, and the entry 4 is the LRU. Moreover, the entries 4 and 5 each hold therein only metadata, and the entry 6 holds therein data and metadata.

Next, an example in which the information processing device 101 is applied to a disk array device will be described using FIG. 3.

(Hardware Configuration Example of Disk Array Device 300)

Figure 3:
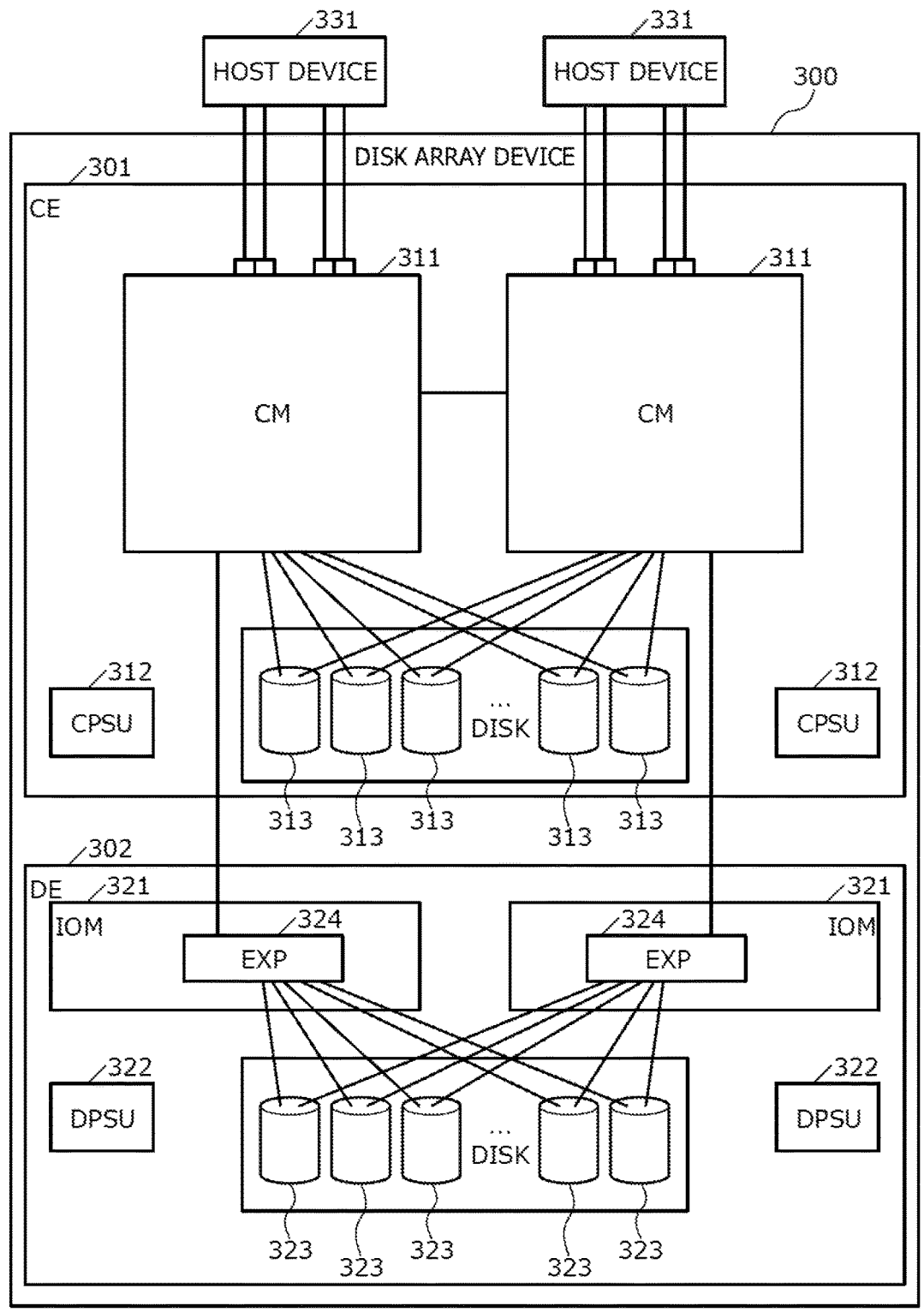
FIG. 3 illustrates a hardware configuration example of a disk array device.

FIG. 3 illustrates a hardware configuration example of a disk array device 300. The disk array device 300 includes a controller enclosure (CE) 301, and a drive enclosure (DE) 302. Moreover, the disk array device 300 is coupled to host devices 331. The host device 331 is, for example, a server.

Further, the CE 301 includes controller modules (CMs) 311, CE power supply units (CPSUs) 312, and disks 313. Moreover, the DE 302 includes input/output (I/O) modules (IOMs) 321, DE power supply units (DPSUs) 322, and disks 323. The IOM 321 includes a serial attached SCSI (SAS) expander (EXP) 324.

The CE 301 is a housing that includes the CMs 311 to the disks 313. The CM 311 is a device that controls the disk array device 300. Moreover, the CM 311 performs a communication between the CMs. Moreover, the CM 311 is coupled to the host device 331. The hardware configuration of the inside of the CM 311 will be described in FIG. 5. The CPSU 312 is a unit that supplies a power source to the devices in the inside of the CE 301. The disk 313 is a storage device used by the CM 311. For example, an SSD or an HDD may be employed as the disk 313.

The DE 302 is a housing that includes the IOMs 321 to the disks 323. The IOM 321 is a unit that controls between the CM 311 and the drives. The DPSU 322 is a unit that supplies a power source to the devices in the inside of the DE 302. The EXP 324 is an expander chip for SAS coupling. The EXP 324 illustrated in FIG. 3 is coupled to all the disks 323. The disk 323 is a storage device used by the CM 311. For example, an SSD or an HDD may be employed as the disk 323.

Figure 4:
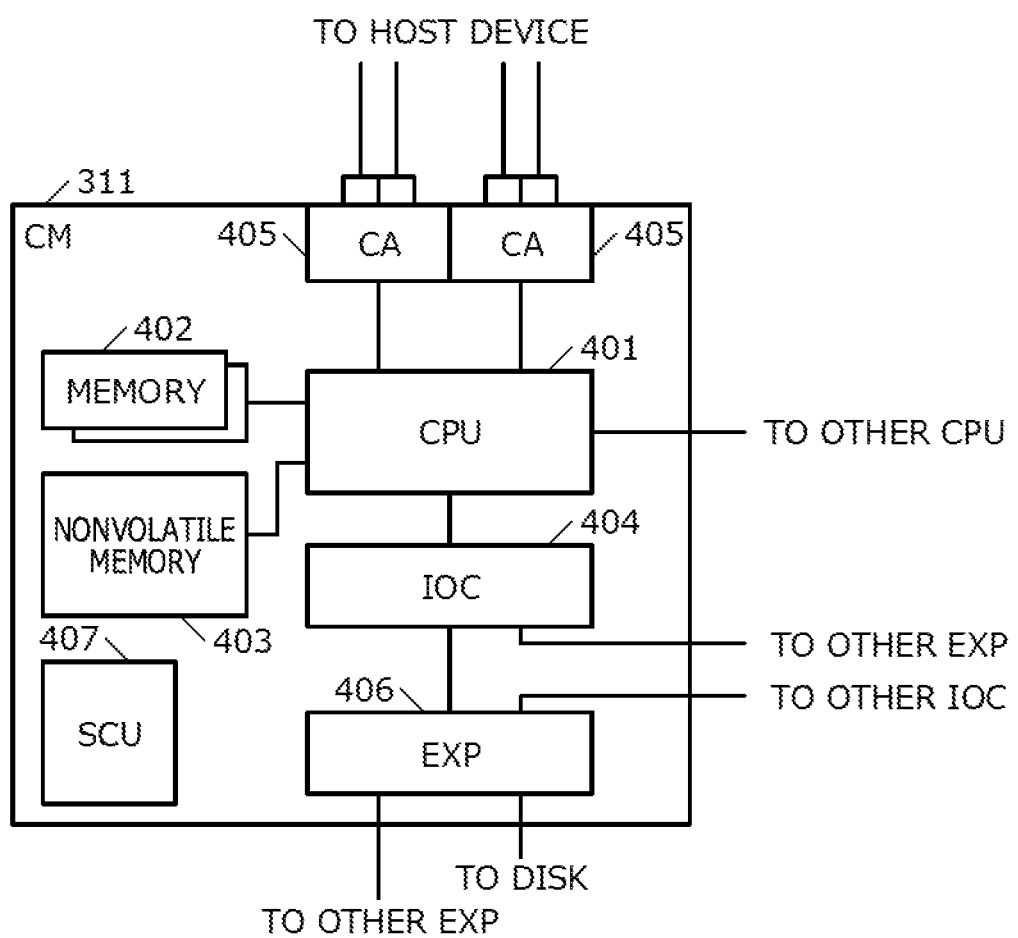
FIG. 4 illustrates a hardware configuration example of a CM.

FIG. 4 illustrates a hardware configuration example of the CM 311. The CM 311 includes a CPU 401, a memory 402, a nonvolatile memory 403, an I/O controller (IOC) 404, a channel adapter (CA) 405, an EXP 406, and a system capacitor unit (SCU) 407.

Here, the CM 311 corresponds to the information processing device 101 illustrated in FIG. 1. Moreover, the memory 402 corresponds to the cache memory 103 illustrated in FIG. 1. Moreover, the disks 313 and 323 correspond to the storage device 102 illustrated in FIG. 1. Hereinafter, for the sake of simple explanation, it is assumed that the memory 402 temporarily stores therein data in the disks 313.

The CPU 401 is a computation processor that entirely controls the CM 311. Moreover, the CPU 401 is coupled to a CPU 401 of another CM 311. The memory 402 is a volatile memory that is used as a work area for the CPU 401. For example, a dynamic random access memory (DRAM) or the like may be employed as the memory 402. The nonvolatile memory 403 is a nonvolatile memory that stores therein a cache memory control program in the present embodiment. As for a storage medium of the nonvolatile memory 403, for example, an NOR flash memory and an NAND flash memory may be employed.

The IOC 404 controls I/O from the CPU 401. In the example of FIG. 4, the IOC 404 is coupled to the EXP 406 and an EXP 406 of another CM 311, and controls the I/O from the CPU 401 to the disks 313 and 323. The CA 405 is a communication interface that communicates with the host device 331. The EXP 406 is an expander chip for SAS coupling. The EXP 406 illustrated in FIG. 4 is coupled to all the disks 313 and the EXP 324. The SCU 407 is a unit that supplies a power source for backing up data in the memory 402 in the nonvolatile memory 403 in power failure.

(Function Configuration Example of CM 311)

Figure 5:
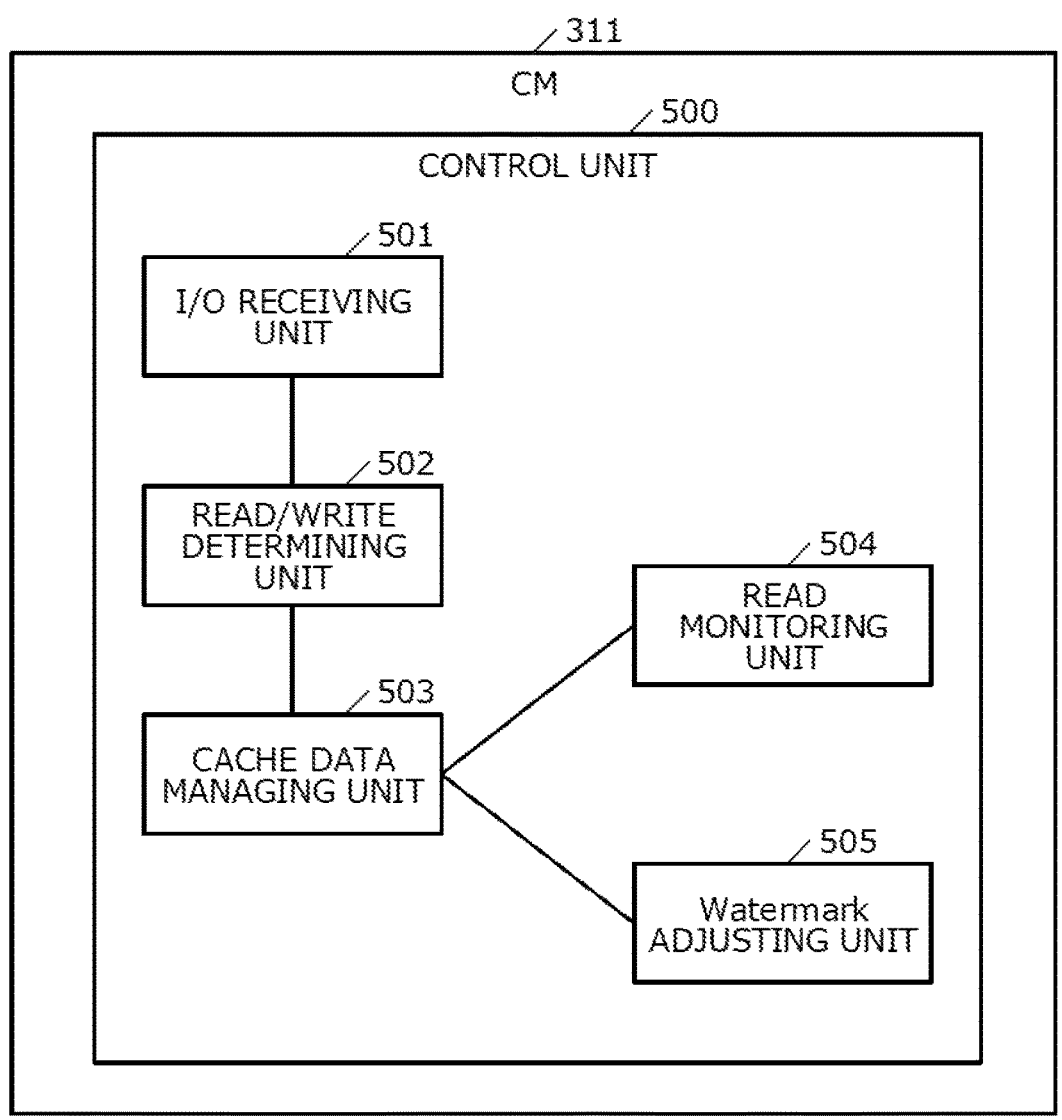
FIG. 5 illustrates a function configuration example of the CM.

FIG. 5 illustrates a function configuration example of the CM 311. The information processing device 101 includes a control unit 500. The control unit 500 includes an I/O receiving unit 501, a read/write determining unit 502, a cache data managing unit 503, a read monitoring unit 504, and a Watermark adjusting unit 505. The control unit 500 implements functions of these units such that the CPU 401 executes programs stored in the storage devices. Examples of the storage devices include the memory 402 and the nonvolatile memory 403, which are illustrated in FIG. 4, and the disks 313 and 323, which are illustrated in FIG. 3. Moreover, the processing results of these units are held in registers and others of the memory 402 and the CPU 401.

The I/O receiving unit 501 receives an access request from the host device 331. The read/write determining unit 502 determines whether the access request received by the I/O receiving unit 501 is a read request or a write request.

The cache data managing unit 503 manages the lists T1, B1, T2 and B2. The read monitoring unit 504 monitors a Read error to a page that has to be originally present in the list T1 or T2, and a Read hit to a Dirty page that has to be originally present in the list B1 or B2. The Watermark adjusting unit 505 changes a Watermark value based on information from the read monitoring unit 504.

The functions of the cache data managing unit 503 to the Watermark adjusting unit 505 will be further described. Here, the cache data managing unit 503 to the Watermark adjusting unit 505 perform the processing with respect to the lists T1 and B1, which is the same as the processing with respect to the lists T2 and B2, and thus, for the sake of simple explanation, the functions thereof will be described using the processing with respect to the lists T1 and B1.

When the LRU entry of the list T1 includes a Dirty page, the read monitoring unit 504 counts the number of consecutive entries including Dirty pages from the LRU entry. This makes it possible to identify Dirty pages that have to be originally present in the list B1 or B2.

The read monitoring unit 504 then compares the first total, which is the number of Read hits to a Dirty page that has to be originally present in the list B1 or B2, with the second total, which is the number of Read errors to a page that has to be originally present in the list T1 or T2. Here, a period during when the number of Read hits or the number of Read errors is counted has any length, and for example, the period is decided by a person in charge of the disk array device 300. The read monitoring unit 504 stores the first total and the second total in the memory 402. Alternatively, each entry in the list T1 or B1 may store therein the number of reads to the entry.

When the second total is more than the first total, the cache data managing unit 503 writes back the Dirty page of the LRU entry in the list T1, and discards the Dirty page of the LRU entry of the list T1. Meanwhile, the read monitoring unit 504 may store a counter for managing the first total and the second total in the memory 402. For example, the read monitoring unit 504 decrements the counter if the Read hit to a Dirty page that has to be originally present in the list B1 or B2 is performed, whereas increments the counter if the Read error to a page that has to be originally present in the list T1 or T2 is performed. The cache data managing unit 503 then determines a comparison result between the first total and the second total based on whether the counter indicates a positive value or a negative value.

Moreover, the Watermark adjusting unit 505 may change a Watermark value serving as a threshold, and the cache data managing unit 503 may write back the Dirty page of the LRU entry in the list T1 based on the changed Watermark value. Here, a Watermark model will be described.

In the Watermark model, two parameters of a Low Watermark value and a High Watermark value are used. A relation of Low Watermark value≤High Watermark value is established. The write-back operation timing in the Watermark model is classified into the following three cases based on the relation among the ratio of Dirty pages in the list T1, the Low Watermark value, and the High Watermark value.

As a first case, when a relation of the ratio of Dirty pages in the list T1<Low Watermark value is established, no operation is performed in the Watermark model. In some cases, a write-back operation may be performed in an idle time.

As a second case, when a relation of Low Watermark value the ratio of Dirty pages in the list T1 High Watermark value is established, a write back operation may be performed or may not be performed in accordance with the determination by the CPU or the liked that performs the processing in the Watermark model.

As a third case, when a relation of High Watermark value<the ratio of Dirty pages in the list T1 is established, a write-back operation is performed in the Watermark model.

In the present embodiment, for the sake of simple explanation, the Low Watermark value and the High Watermark value having a relation of Low Watermark value=High Watermark value are assumed, and are simply called "Watermark value". Accordingly, the Watermark value is a threshold that is compared with the ratio of Dirty pages in the list T1, and is used as the threshold to write back the Dirty page of the LRU entry in the list T1 and discard it when the threshold is smaller than the ratio of Dirty pages in the list T1. Moreover, a Watermark value is present for each pair of a list including an entry that includes a page and a Ghost list including an entry in which a page in the list is discarded. Accordingly, in the present embodiment, a Watermark value corresponding to a pair of the lists T1 and B1 and a Watermark value corresponding to a pair of the lists T2 and B2 are present. Moreover, a counter corresponding to the pair of the lists T1 and B1 and a counter corresponding to the pair of the lists T2 and B2 are also present in the read monitoring unit 504.

The Watermark adjusting unit 505 sets the Watermark value smaller than a current value when the second total is more than the first total. Meanwhile, the Watermark adjusting unit 505 sets the Watermark value larger than a current value when the first total is more than the second total. Setting a smaller Watermark value makes it easy to perform a write-back operation on a Dirty page, whereas setting a larger Watermark value makes it difficult to perform a write-back operation on a Dirty page.

Figure 6:
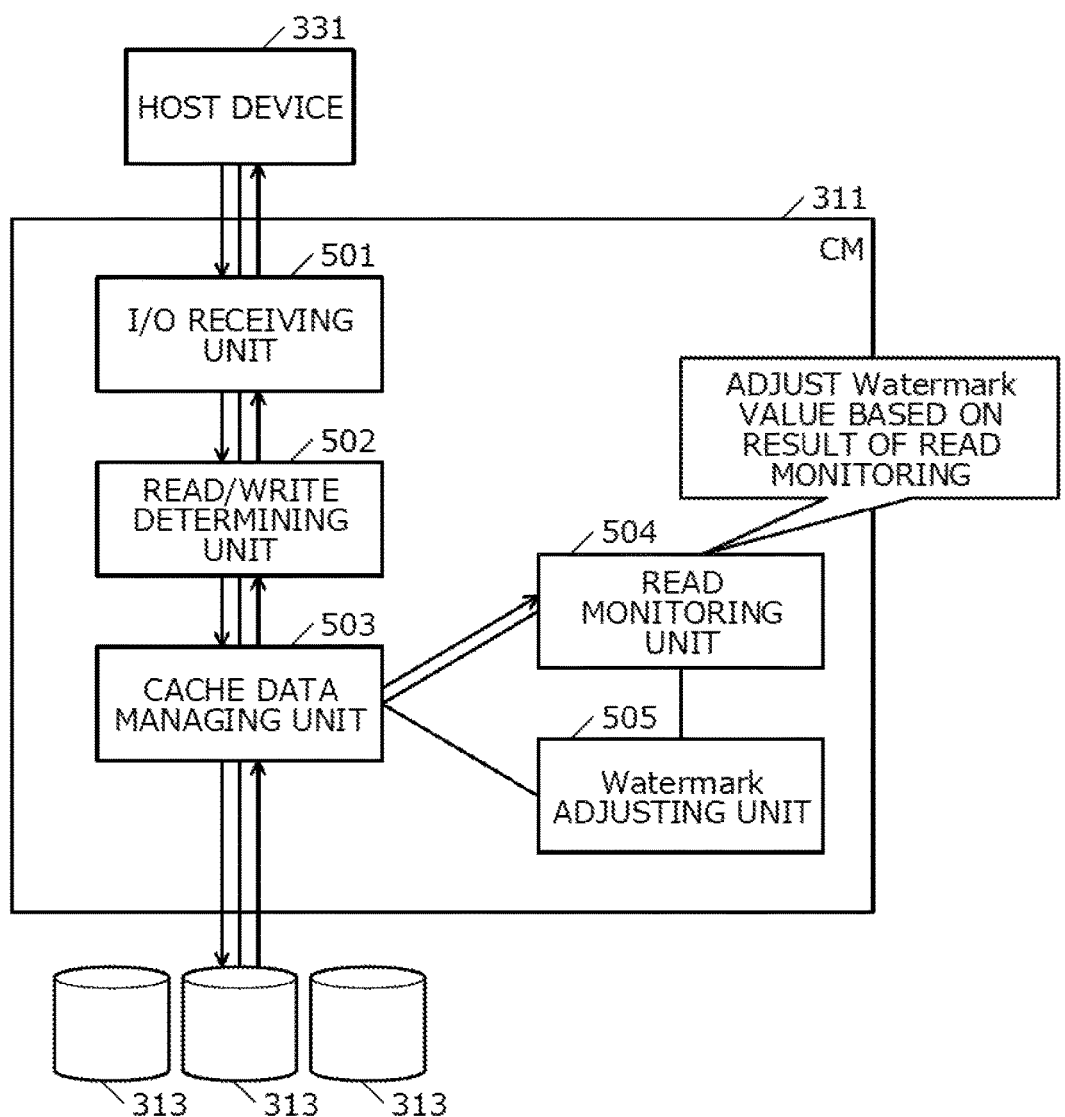
FIG. 6 illustrates an operation example in reading.

FIG. 6 illustrates an operation example in reading. When the host device 331 issues a read request, the I/O receiving unit 501, the read/write determining unit 502, and the cache data managing unit 503 process the read request, and transmit read data to the host device 331. Moreover, the read monitoring unit 504 monitors a result of the reading.

Figure 7:
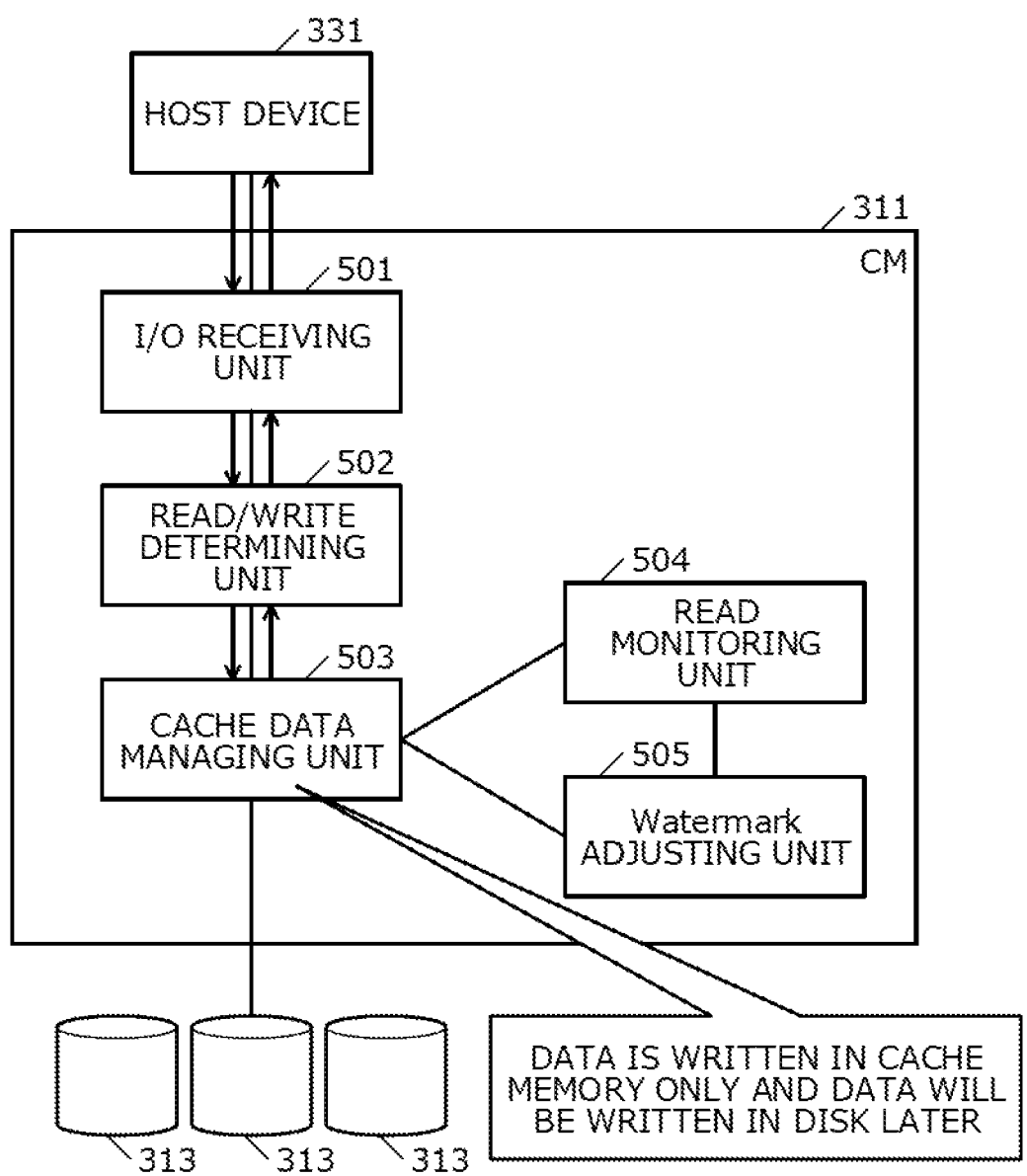
FIG. 7 illustrates an operation example in writing.

FIG. 7 illustrates an operation example in writing. When the host device 331 issues a write request, the I/O receiving unit 501, the read/write determining unit 502, and the cache data managing unit 503 process the write request. In this processing, the cache data managing unit 503 writes data in a cache memory such as the memory 402, and notifies the host device 331 of a completion of the writing. The cache data managing unit 503 writes the data later in the disk 313.

Figure 8:
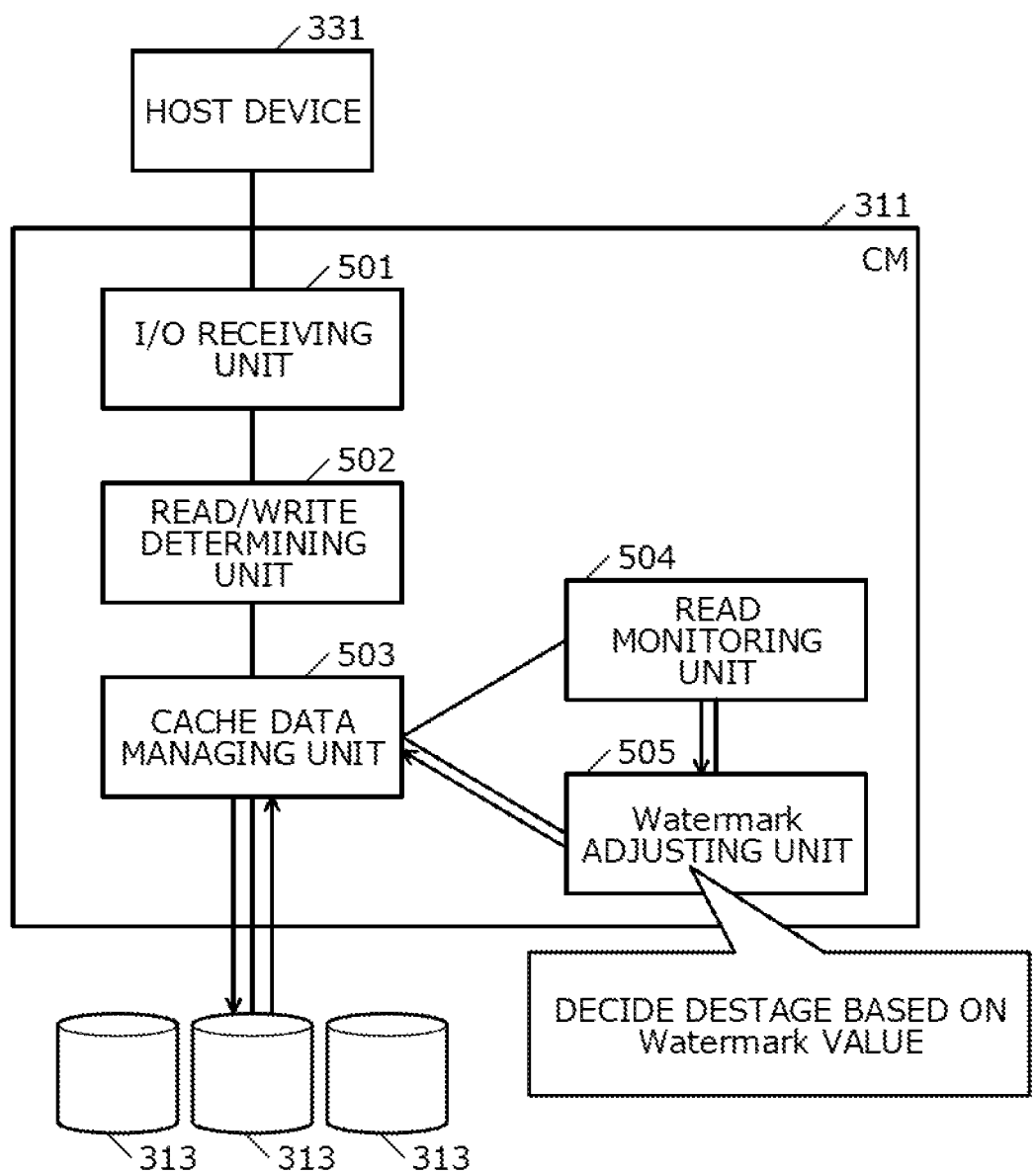
FIG. 8 illustrates an operation example of writing to the disk.

FIG. 8 illustrates an operation example of writing to the disk 313. When the data is written in the disk 313, the Watermark adjusting unit 505 decides a destage based on the Watermark value. Here, the destage indicates the content of the memory 402 that is used as a cache memory is written into the disk 313.

Figure 9:
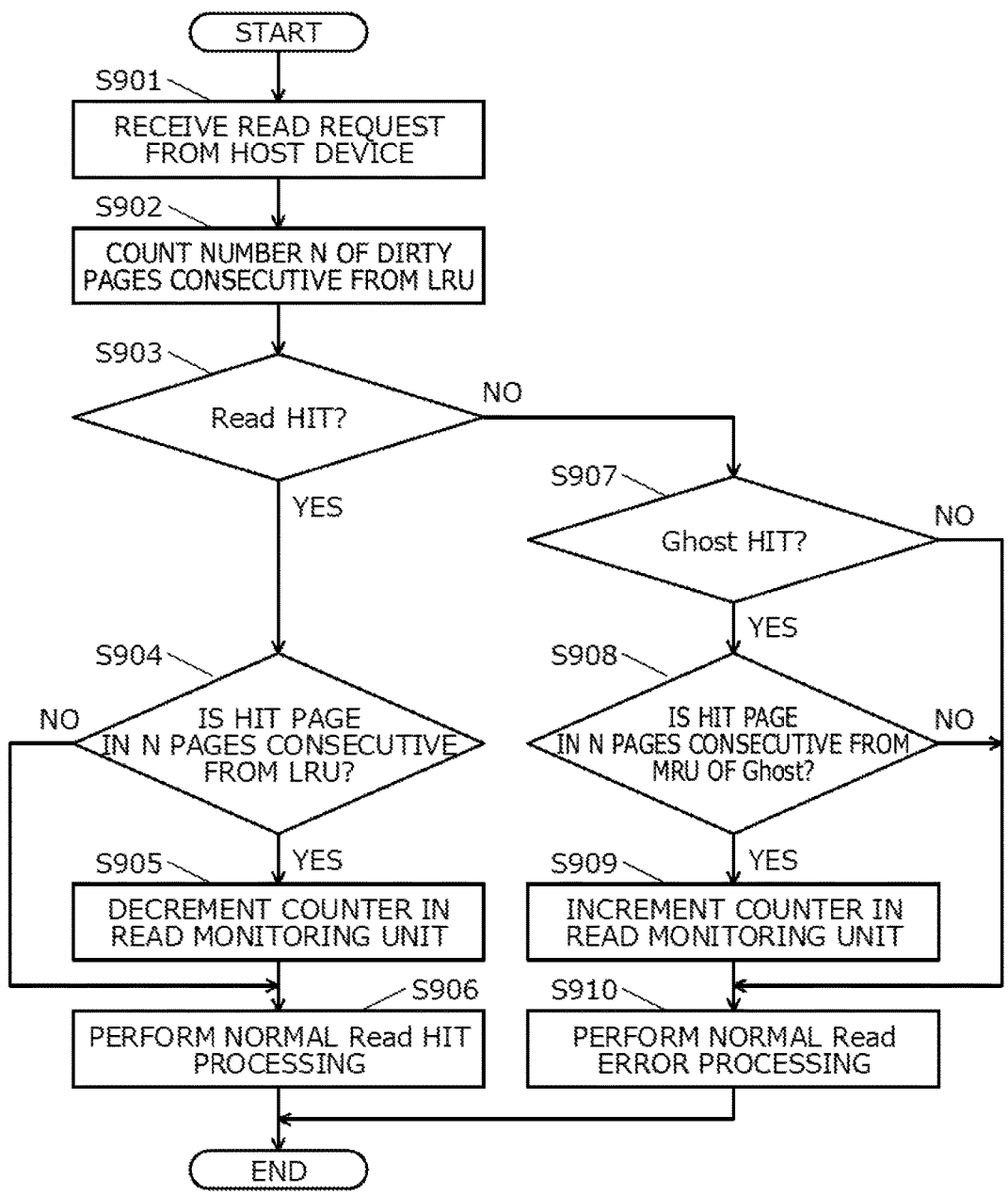
FIG. 9 is a flowchart illustrating an example of a reading processing procedure.
Figure 10:
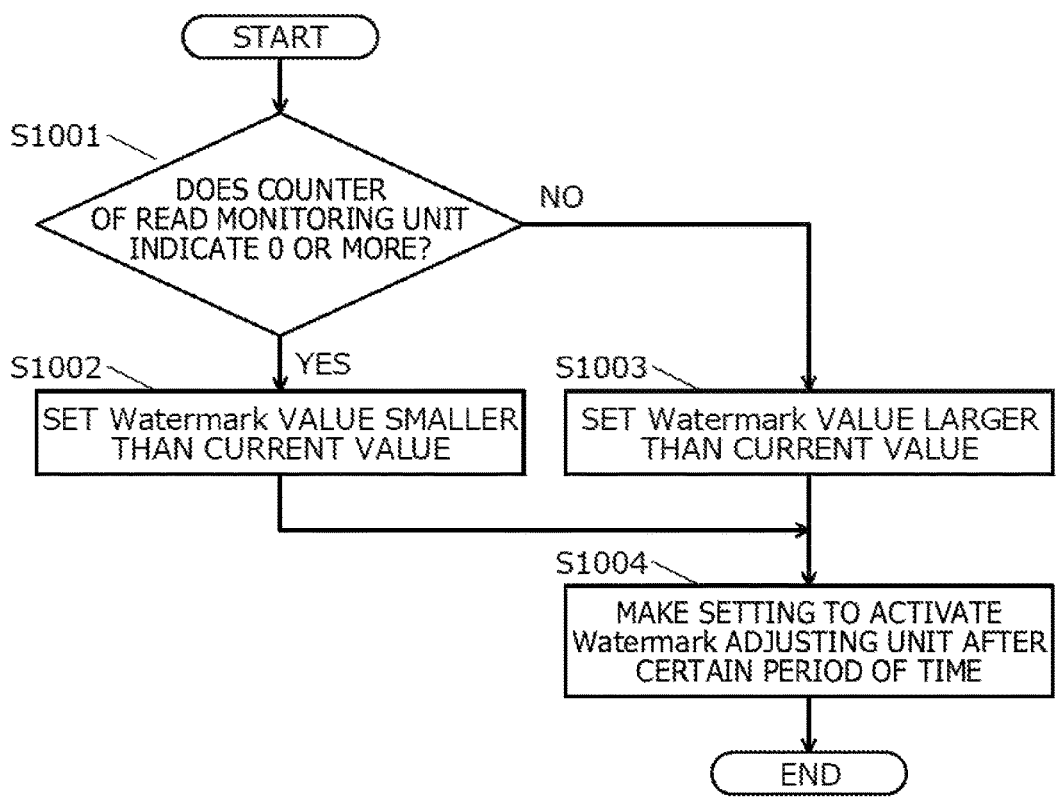
FIG. 10 is a flowchart illustrating an example of a processing procedure of a Watermark adjusting unit.
Figure 11:
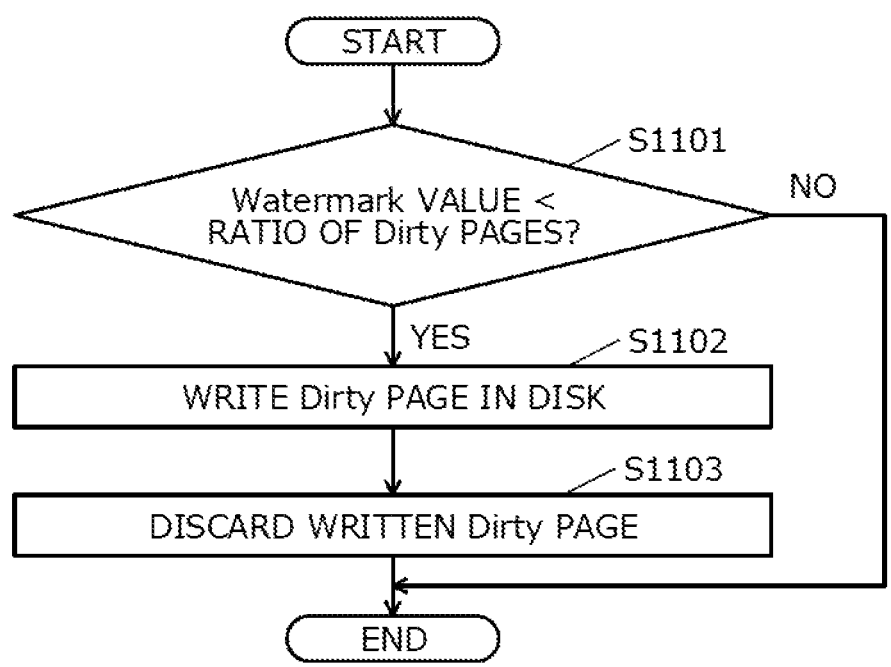
FIG. 11 is a flowchart illustrating an example of a processing procedure of a cache data managing unit.

Next, a flowchart illustrating the processing executed by the CM 311 will be described using FIGS. 9, 10, and 11. Here, the cache memory control method in the present embodiment may be performed to the pair of the lists T1 and B1, may be performed to the pair of the lists T2 and B2, or may be performed to the both of the pair of the lists T1 and B1 the pair of the lists T2 and B2. In FIGS. 9 to 11, an example in which the cache memory control method in the present embodiment is performed to the pair of the lists T1 and B1 will be described.

FIG. 9 is a flowchart illustrating an example of a reading processing procedure. The CM 311 receives a read request from a host device (step S901). Next, the CM 311 counts a consecutive number N of Dirty pages counted from the LRU side in the list T1 (step S902). The CM 311 then determines whether the read request corresponds to a case of Read hit (step S903). Here, the case of Read hit is a case where an address of a reading destination of the read request matches an address of any one of the entries in the list T1. Hereinafter, the entry with the matched address in the list T1 is called "Read hit entry".

If the read request corresponds to the case of Read hit (step S903: Yes), the CM 311 successively determines whether the Read hit entry is included within the number N of entries consecutive from the LRU (step S904). If the Read hit entry is included within the number N of entries consecutive from the LRU (step S904: Yes), the CM 311 decrements the counter in the read monitoring unit 504 (step S905).

After the processing at step S905 is ended or if the Read hit entry is not included within the number N of entries consecutive from the LRU (step S904: No), the CM 311 executes normal Read hit processing (step S906). As for the normal Read hit processing, for example, the CM 311 reads a page of the Read hit entry in the list T1, and transmits the page to the host device 331. Moreover, in accordance with the processing of the ARC, the CM 311 moves the Read hit entry in the list T1 to the list T2.

On the other hand, if the read request corresponds to a case of Read hit (step S903: No), the CM 311 determines whether the read request corresponds to a case of Ghost hit (step S907). Here, the case of Ghost hit is a case where an address of a reading destination of the read request matches an address of any one of the entries in the list B1. The entry with the matched address in the list B1 is called "Ghost hit entry".

If the read request corresponds to the case of Ghost hit (step S907: Yes), the CM 311 successively determines whether the Ghost hit entry is included within the number N of entries consecutive from the MRU in the Ghost list (step S908). If the Ghost hit entry is located within the number N of entries consecutive from the MRU in the Ghost list (step S908: Yes), the CM 311 increments the counter in the read monitoring unit 504 (step S909).

After the processing at step S909 is ended, the read request does not correspond to the case of Ghost hit (step S907: No), or if the Ghost hit entry is not included within the number N of entries consecutive from the MRU in the Ghost list (step S908: No), the CM 311 executes normal Read error processing (step S910). As for the normal Read error processing, the CM 311 reads data from the disk 313, and transmits the read data to the host device 331. Moreover, in accordance with the processing of the ARC, the CM 311 evicts the eviction target entry, and adds the read data to the list T1.

After the processing at step S906 or the processing at step S910 is ended, the CM 311 ends the reading processing.

FIG. 10 is a flowchart illustrating an example of a processing procedure of the Watermark adjusting unit 505. The Watermark adjusting unit 505 determines whether the counter of the read monitoring unit 504 is 0 or more (step S1001). If the counter of the read monitoring unit 504 is 0 or more (step S1001: Yes), the Watermark adjusting unit 505 sets a Watermark value smaller than a current value (step S1002).

On the other hand, if the counter of the read monitoring unit 504 is less than 0 (step S1001: No), the Watermark adjusting unit 505 sets a Watermark value larger than the current value (step S1003).

After the processing at step S1002 or the processing at step S1003 is ended, the Watermark adjusting unit 505 sets the Watermark adjusting unit 505 so as to be reactivated after a certain period of time (step S1004). After the processing at step S1004 is ended, the Watermark adjusting unit 505 ends a series of the processing.

FIG. 11 is a flowchart illustrating an example of a processing procedure of the cache data managing unit 503. A series of processing illustrated in FIG. 11 may be performed after the processing at step S1002 or the processing at S1003 illustrated in FIG. 10 is ended, or may be periodically performed.

The cache data managing unit 503 determines whether the Watermark value is less than the ratio of Dirty pages in the list T1 (step S1101). If the Watermark value is less than the ratio of Dirty pages (step S1101: Yes), the cache data managing unit 503 writes the Dirty page in the disk 313 (step S1102). For example, the cache data managing unit 503 writes the Dirty page of the entry serving as the LRU in the list T1, in the disk 313. Moreover, the number of Dirty pages written in the above process may be one or any number up to a number that keeps the Watermark value less than the ratio of Dirty pages. When multiple Dirty pages are written, the cache data managing unit 503 writes to the disk 313 the Dirty pages in the order from the LRU in the list T1.

Next, the cache data managing unit 503 discards the Dirty page having been written (step S1103). An entry from which the Dirty page is discarded includes only metadata, and thus is moved into the list B1. After the processing at step S1103 is ended or if the Watermark value is larger than the ratio of Dirty pages (step S1101: No), the cache data managing unit 503 ends the series of the processing.

As is explained in the foregoing, the CM 311 counts the number of Dirty pages consecutive from the LRU in the list T1, and writes back the Dirty page at the LRU in the list T1 and discards it if entries, in the number thus counted, consecutive from the top in the list B1 are read more frequently than the entries including the Dirty pages in the list T1. This enables the CM 311 to know such a suitable write-back operation timing that the Read hit rate may improve. Moreover, although the numbers of reads to the lists T1 and B1 are compared in the present embodiment described above, what are compared may be the number of writes or the number of accesses including both reads and writes. For example, each entry in the list T1 or B1 may store therein the number of accesses to the entry.

Moreover, the CM 311 may adjust the write-back operation on the Dirty page by adjusting the Watermark value. This makes it easy to employ the present embodiment to a device that employs the Watermark model.

Moreover, in the present embodiment, the first list serving as a normal list may include an entry including a data piece that has been accessed once among the data pieces in the disk 313 and metadata on the data piece. Moreover, the first list may include an entry including a data piece that has been accessed twice or more among the data pieces in the disk 313 and metadata on the data piece. This makes it easy to employ the present embodiment to a device that employs the ARC.

Moreover, the present embodiment is applicable to a device that does not employ the ARC and includes only a normal list. Here, the normal list may be a list based on any cache replacement policy as a predetermined cache replacement policy, and for example, may be a list based on the LRU or a list based on the LFU. Further, preparing a Ghost list paired with the normal list enables the CM 311 to know a suitable write-back operation timing.

Note that, the cache memory control method having been explained in the present embodiment may be implemented such that a computer such as a personal computer or a work station executes a prepared program in advance. The cache memory control program is recorded on a computer-readable recording medium such as a hard disk, a flexible disk, a compact disc-read only memory (CD-ROM), or a digital versatile disk (DVD), and is executed such that the computer reads the cache memory control program from the recording medium. Moreover, the cache memory control program may be distributed via s network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
   a storage device configured to store a plurality of data pieces;
   a cache memory configured to store a first list and a second list, the first list including one or more entries that include any one of the plurality of data pieces and information indicating a location of the plurality of data piece on the storage device, and the second list including one or more entries that include information indicating a location on the storage device of a data piece included in an entry that has been evicted from the first list; and
   a processor coupled to the storage device and the cache memory, wherein the processor is configured to:
      when there is an update of data piece of a first entry which is determined as an eviction target entry in the first list by determining that the first entry is unlikely to be used based on a priority in accordance with a predetermined cache replacement policy, count, starting with the first entry and in the order of the priority, a count number of entries including an updated data piece consecutively up to find a second entry including a not-updated data piece;
      count a number of accesses to first one or more entries in the first list from the first entry to an entry immediately before the second entry consecutively in the order of the priority and acquire a first total value;
      count a number of accesses to second one or more entries in the second list from a third entry which is added to the second list lastly by the count number in the order of the priority and acquire a second total value;
      compare the first total value and the second total value; and
      when the second total value is larger than the first total value, write one or more data pieces of the first one or more entries in the storage device, and discard the data piece of the first entry as the eviction target entry from the cache memory.

2. The information processing device according to claim 1, wherein the processor is configured to: when the second total value is larger than the first total value, set a threshold to a value smaller than a current value of the threshold, the threshold being to be compared with a ratio of entries including the data pieces updated in the first list and to be used such that when the threshold is smaller than the ratio, the data of the eviction target entry is written in the storage device and the data of the eviction target entry is discarded, and when the first total value is larger than the second total value, set the threshold to a value larger than the current value.

3. The information processing device according to claim 1, wherein the first list is a list that includes one or more entries, the one or more entries including a data piece accessed only once among the plurality of data pieces and information indicating a location of the data on the storage device.

4. The information processing device according to claim 1, wherein the first list is a list that includes one or more entries, the one or more entries including a data piece accessed twice or more among the plurality of the data pieces and information indicating a location of the data on the storage device.

5. A method of controlling a cache memory, the method comprising:
- storing a first list and a second list in the cache memory, the first list including one or more entries that include any one of a plurality of data pieces stored in a storage device and information indicating a location of the plurality of data piece on the storage device, and the second list including one or more entries that include information indicating a location on the storage device of a data piece included in an entry that has been evicted from the first list;
- when there is an update of a data piece of a first entry which is determined as an eviction target entry in the first list by determining that the first entry is unlikely to be used based on a priority in accordance with a predetermined cache replacement policy, counting, by a processor, starting with the first entry and in the order of the priority, a count number of entries including an updated data piece consecutively up to find a second entry including a not-updated data piece;
- counting a number of accesses to first one or more entries in the first list from the first entry to an entry immediately before the second entry consecutively in the order of the priority and acquire a first total value;
- counting a number of accesses to second one or more entries in the second list from a third entry which is added to the second list lastly by the count number in the order of the priority and acquire a second total value;
- comparing the first total value and the second total value; and
- when the second total value is larger than the first total value, writing one or more data pieces of the first one or more entries in the storage device, and discarding the data piece of the first entry as the eviction target entry from the cache memory.

6. The method according to claim 5, the method further comprising: when the second total value is larger than the first total value, setting a threshold to a value smaller than a current value of the threshold, the threshold being to be compared with a ratio of entries including the data pieces updated in the first list and to be used such that when the threshold is smaller than the ratio, the data of the eviction target entry is written in the storage device and the data of the eviction target entry is discarded; and when the first total value is larger than the second total value, setting the threshold to a value larger than the current value.

7. The method according to claim 5, wherein the first list is a list that includes one or more entries, the one or more entries including a data piece accessed only once among the plurality of data pieces and information indicating a location of the data on the storage device.

8. The method according to claim 5, wherein the first list is a list that includes one or more entries, the one or more entries including a data piece accessed twice or more among the plurality of the data pieces and information indicating a location of the data on the storage device.

9. A non-transitory storage medium storing a program that causes an information processing device including a cache memory to execute a process, the process comprising:
- storing a first list and a second list in the cache memory, the first list including one or more entries that include any one of a plurality of data pieces stored in a storage device and information indicating a location of the plurality of data piece on the storage device, and the second list including one or more entries that include information indicating a location on the storage device of a data piece included in an entry that has been evicted from the first list;
- when there is an update of a data piece of a first entry which is determined as an eviction target entry in the first list by determining that the first entry is unlikely to be used based on a priority in accordance with a predetermined cache replacement policy, counting, starting with the first entry and in the order of the priority, a count number of entries including an updated data piece consecutively up to find a second entry including a not-updated data piece;
- counting a number of accesses to first one or more entries in the first list from the first entry to an entry immediately before the second entry consecutively in the order of the priority and acquire a first total value;
- counting a number of accesses to second one or more entries in the second list from a third entry which is added to the second list lastly by the count number in the order of the priority and acquire a second total value;
- comparing the first total value and the second total value; and
- when the second total value is larger than the first total value, writing one or more data pieces of the first one or more entries in the storage device, and discarding the data piece of the first entry as the eviction target entry from the cache memory.

10. The storage medium according to claim 9, wherein the process further comprises: when the second total value is larger than the first total value, setting a threshold to a value smaller than a current value of the threshold, the threshold being to be compared with a ratio of entries including the data pieces updated in the first list and to be used such that when the threshold is smaller than the ratio, the data of the eviction target entry is written in the storage device and the data of the eviction target entry is discarded; and when the first total value is larger than the second total value, setting the threshold to a value larger than the current value.

11. The storage medium according to claim 9, wherein the first list is a list that includes one or more entries, the one or more entries including a data piece accessed only once among the plurality of data pieces and information indicating a location of the data on the storage device.

12. The storage medium according to claim 9, wherein the first list is a list that includes one or more entries, the one or more entries including a data piece accessed twice or more among the plurality of the data pieces and information indicating a location of the data on the storage device.

* * * * *